C. N. CLARK.
TRAY FOR DISH WASHING MACHINES.
APPLICATION FILED JAN. 20, 1916.
1,187,711.
Patented June 20, 1916.
2 SHEETS—SHEET 1.
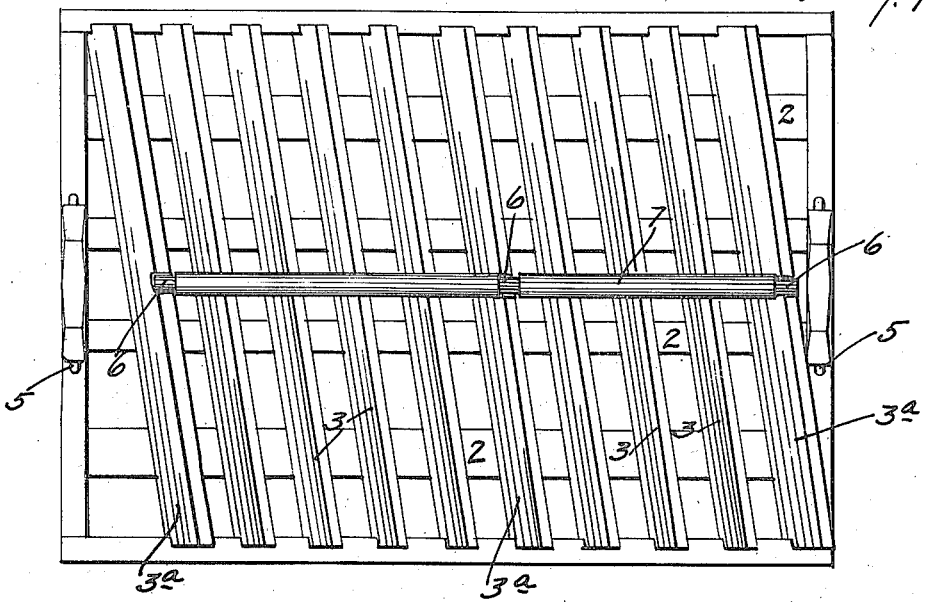
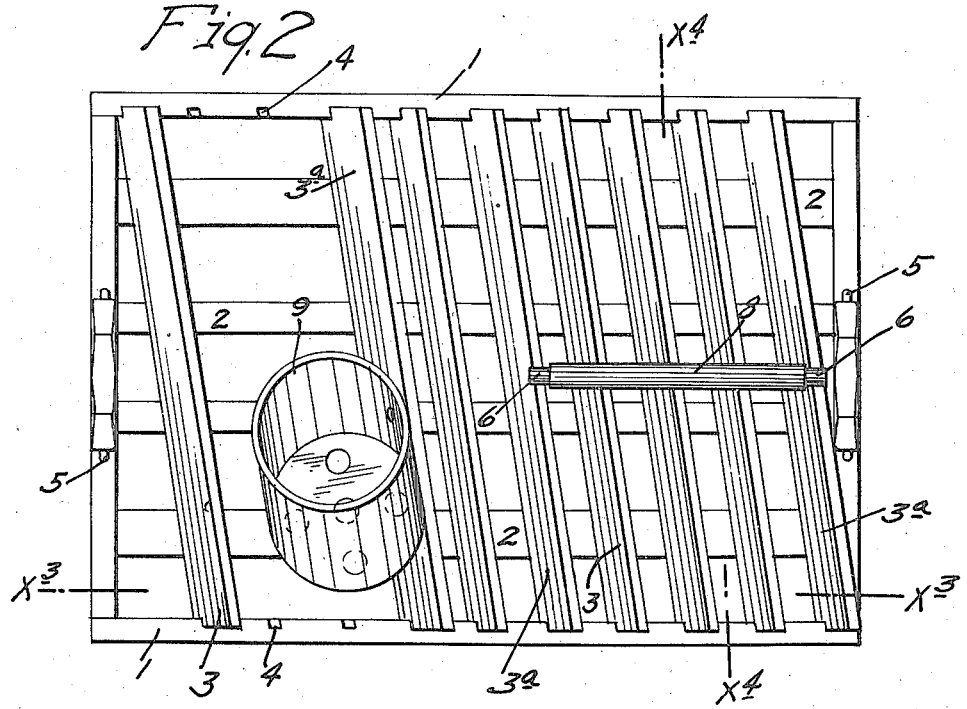
WITNESSES
E. C. Skinkle
A. H. Opsahl
INVENTOR
Charlie N. Clark
BY HIS ATTORNEYS
Williamson Merchant

C. N. CLARK.
TRAY FOR DISH WASHING MACHINES.
APPLICATION FILED JAN. 20, 1916.

1,187,711.

Patented June 20, 1916.
2 SHEETS—SHEET 2.

WITNESSES
E. C. Skinkle
U. H. Opsahl

INVENTOR
Charlie N. Clark
BY HIS ATTORNEYS
Williamson Merchant

UNITED STATES PATENT OFFICE.

CHARLIE N. CLARK, OF MINNEAPOLIS, MINNESOTA, ASSIGNOR TO TWIN CITY DISH WASHER COMPANY, OF MINNEAPOLIS, MINNESOTA, A CORPORATION OF MINNESOTA.

TRAY FOR DISH-WASHING MACHINES.

1,187,711. Specification of Letters Patent. Patented June 20, 1916.

Application filed January 20, 1916. Serial No. 73,142.

*To all whom it may concern:*

Be it known that I, CHARLIE N. CLARK, a citizen of the United States, residing at Minneapolis, in the county of Hennepin and State of Minnesota, have invented certain new and useful Improvements in Trays for Dish-Washing Machines; and I do hereby declare the following to be a full, clear, and exact description of the invention, such as will enable others skilled in the art to which it appertains to make and use the same.

My present invention relates to dish washing machines, and has for its object to provide an improved dish holding rack or tray. Particularly, the invention has for its object to provide a tray or rack especially adapted for use in connection with dish washing machines of the type disclosed and claimed in my pending application S. N. 52,437, filed Sept. 24, 1915.

In the accompanying drawings which illustrate the invention, like characters indicate like parts throughout the several views.

Figure 3:
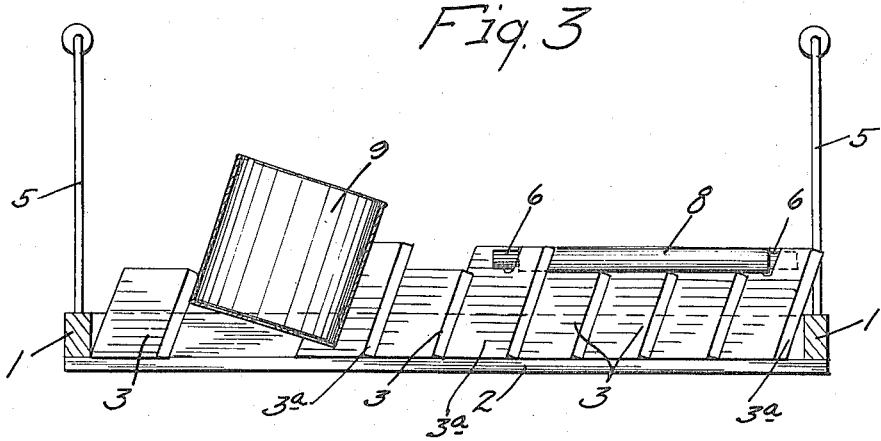
Figure 4:
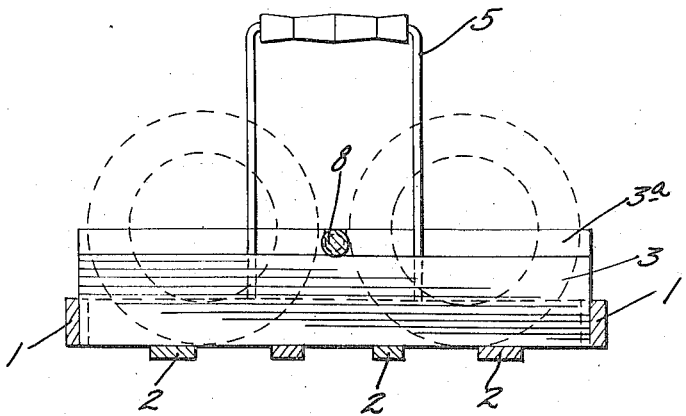

Referring to the drawing: Figures 1 and 2 are plan views of the improved tray illustrating different adjustments of the movable parts thereof; Fig. 3 is a vertical section taken approximately on the line $x^3$ $x^3$ of Fig. 2, some parts being shown in full; and Fig. 4 is a transverse vertical section taken approximately on the line $x^4$ $x^4$ of Fig. 2.

The tray comprises a rectangular marginal frame 1 having permanently secured longitudinally extended bottom slats 2 and removable partitions or spacing bars 3 and 3ª. The partition bars 3 and 3ª are alike except that the latter stand higher at their upper edges than the former, but they are all set obliquely, both in respect to a vertical and in respect to the transverse end bars of the tray, and they are all detachably seated in notches 4 cut in the inner edges of the side bars of the tray. For lifting the tray, the end bars of the frame 1 are shown as provided with raised carrying yokes or handles 5.

The upper edges of the relatively high spacing bars 3ª, of which, as shown, there are three, have notches at their centers adapted to receive reduced portions 6 of dividing rods 7 and 8. The dividing rod or bar 7 is long enough to reach longitudinally across all of the partition bars, while the rod 8 is only long enough to reach longitudinally across about one-half of the said spacing rods.

To one of the spacing bars 3 is attached an obliquely set cup 9 adapted to hold the handle portions of forks, knives, spoons, and the like. The bottom of the said cup is perforated to permit the water to run readily therefrom.

When the tray above described is placed in a washing machine of the character disclosed in my said co-pending application, water will be thrown onto the tray in a direction parallel to the end bars thereof. The dishes held in the spaces between the bars 3 and 3ª will, therefore, be set oblique to the direction in which the water is dashed against the same, so that the water will be thrown against the exposed faces of the dishes obliquely, thereby insuring good washing of the dishes. When all of the bars 3 and 3ª are in the rack and the dividing rods are removed, the rack is then adapted to hold large dishes, in the spaces between the partitions or dividing bars. When the long dividing rod 7 is applied, as shown in Fig. 1, the rack is then adapted to hold small dishes, such as saucers or shallow sauce dishes. To adjust the rack to hold tea cups or deep dishes, certain of the spacing bars should be removed so as to widen the space between adjacent spacing bars. When the partition having the cup 9 is applied in the rack, it is adapted to hold knives, forks and spoons, so that they will be washed by the action of the machine. The knives, forks, and spoons to be washed should be placed with the handles in the cup and with their other ends projecting and exposed to the action of the water from the washing machine. The cup is obliquely set so that the knives, forks and spoons will be held in oblique positions.

To make room for the cup 9, several of the partitions or spacing bars should be removed, as shown in Figs. 2 and 3. With the parts of the rack adjusted as shown in Figs. 2 and 3, it is adapted to hold several plates, a large number of saucers and several tea cups. To adapt the rack to hold tea cups, requires the removal of about two spacing bars from between the spacing bars between which the tea cups are to be inserted. From what has been said, it is thought to be evident that the tray can be adjusted in a great many different ways, so as to thereby adapt it to hold all sorts of dishes, tea cups, and other articles, such as knives, forks and spoons. The rack is therefore of such adjustable character that it is not necessary to furnish different kinds of racks for the same washing machine, but, of course, any desired number of these trays may be employed in connection with a single washing machine.

What I claim is:

1. A tray for dish washing machines comprising a rectangular frame having a skeleton bottom, and provided with removable spacing bars, certain of which spacing bars are higher than others, and a dividing rod having interlocking detachable engagement with the upper edges of the said relatively high spacing bars.

2. A rectangular tray for dish washing machines provided with spacing bars that are obliquely set, both in respect to the sides and to the bottom thereof, the said spacing bars being removable, and a cup-like holder applied to one of said dividing bars and set oblique in respect to the bottom of said tray.

In testimony whereof I affix my signature in presence of two witnesses.

CHARLIE N. CLARK.

Witnesses:
HARRY D. KILGORE,
F. D. MICHAEL.